Figure 1:
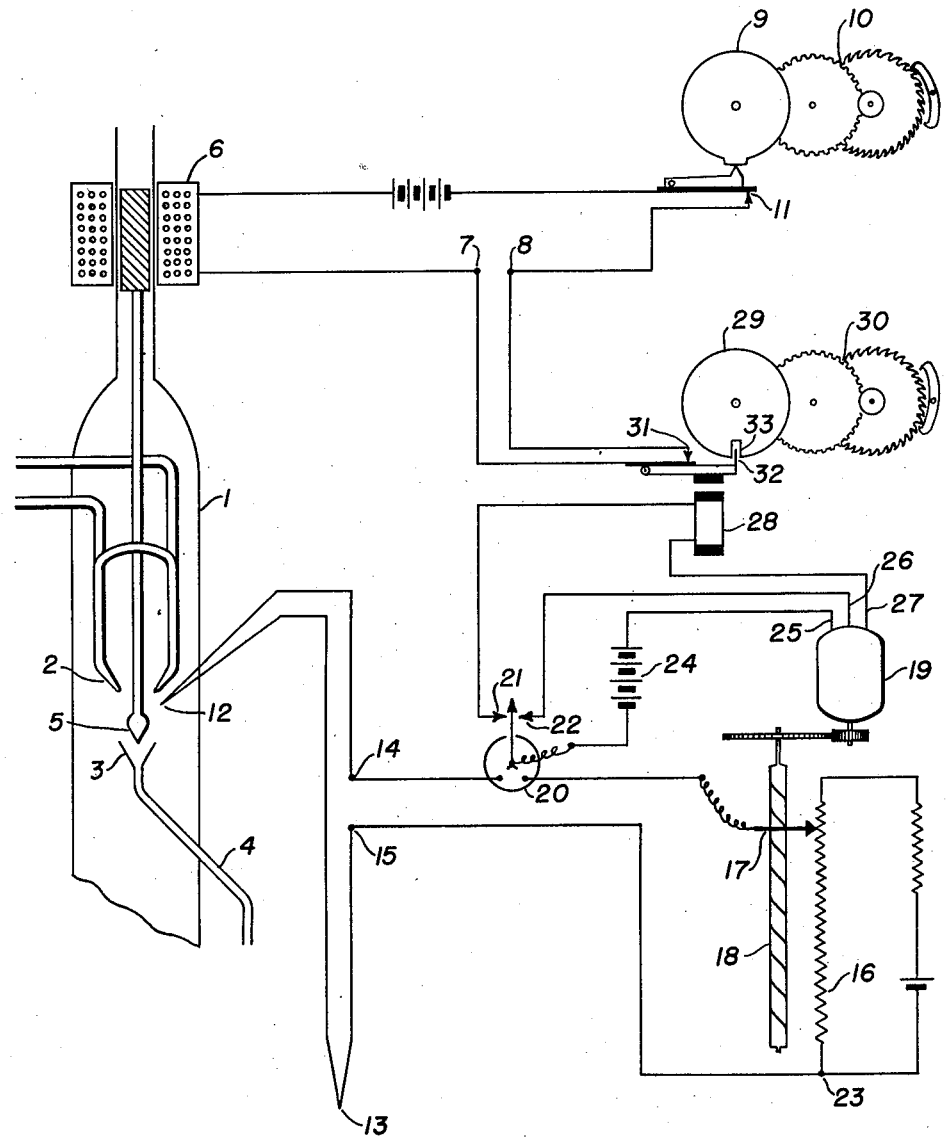

June 12, 1951

L. S. GALSTAUN ET AL 2,556,752

REFLUX RATIO CONTROL

Filed Sept. 3, 1948

2 Sheets-Sheet 1

INVENTORS:
LIONEL S. GALSTAUN
EDWARD R. KEEVER

BY Thomas G. Bell

AGENT

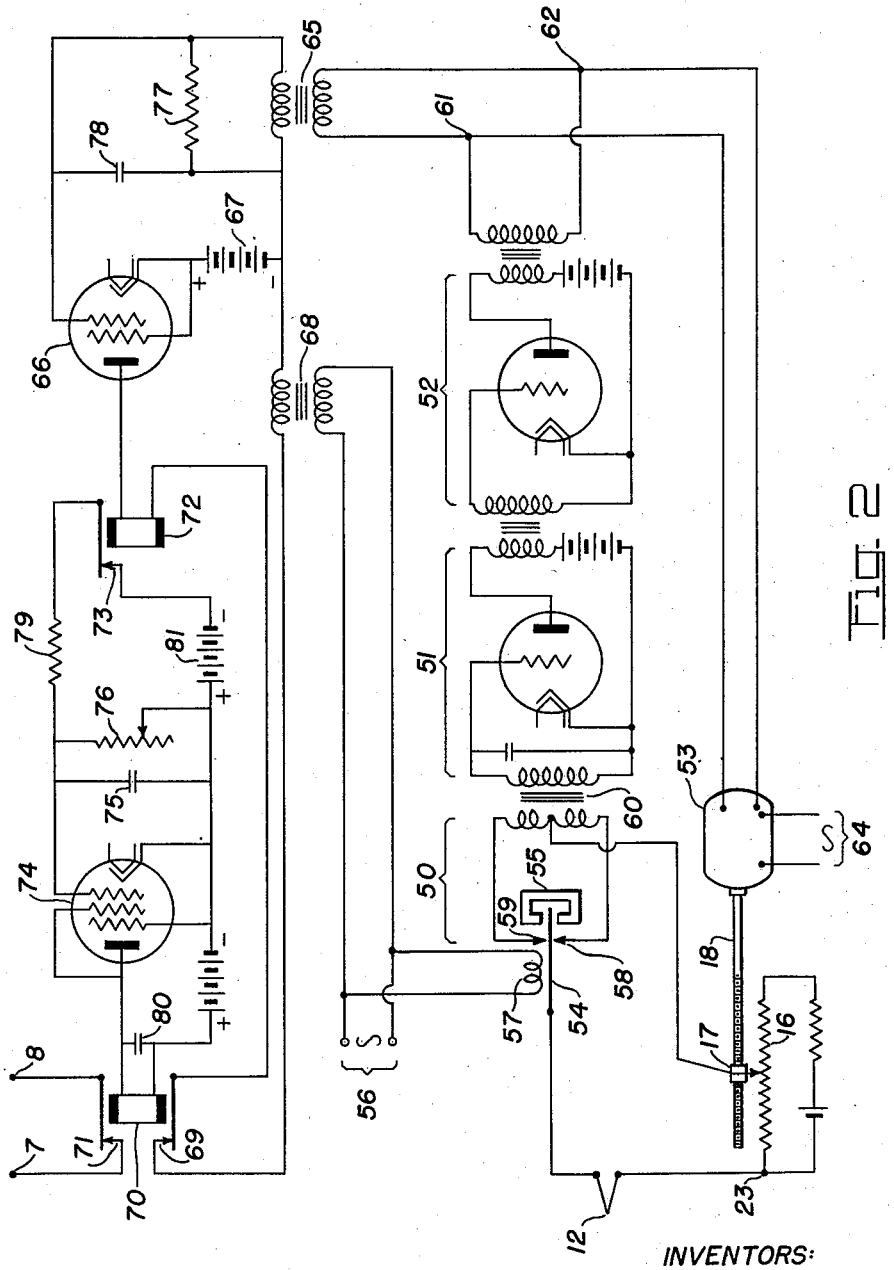

Patented June 12, 1951

2,556,752

UNITED STATES PATENT OFFICE 2,556,752

REFLUX RATIO CONTROL

Lionel S. Galstaun, San Francisco, and Edward R. Keever, Martinez, Calif., assignors to Tide Water Associated Oil Company, San Francisco, Calif., a corporation of Delaware Application September 3, 1948, Serial No. 47,728

3 Claims. (Cl. 202—161)

This invention relates to distillation columns, and more particularly to means for automatically attaining desired reflux ratios during distillation and automatically changing the reflux ratio during critical periods of operation. The invention is primarily adapted for use in conjunction with batch stills of the type commonly employed in laboratory investigations, although it also has utility in certain commercial distillation operations especially where close fractionation of product is desired.

It is an object of the invention to provide means for automatically maintaining a higher reflux ratio in a distillation column during those periods when distillate product is changing and a lower ratio during those periods when the composition of the product is constant.

Another object is to provide automatic means to cutoff, or diminish, the product draw-off from a distillation column during periods of temperature rise.

An object of a specific embodiment of the invention is to provide means for coupling a thermocouple operated temperature recorder to the reflux ratio control apparatus of a distillation column to change the reflux ratio upon a change of temperature.

Other objects will be apparent from the following description.

In the laboratory investigation of mixtures of distillable liquids, and in certain commercial operations where such liquids are to be separated into components, it is common practice to distill these in a "batch" type still provided with an adequate distilling column containing packing, bubble plates, or other contact means. The vapors from the top of the contact material are usually condensed and a portion thereof returned to the column to provide reflux while a second portion is withdrawn as distillate or product. The ratio of the quantity of condensate returned to the column to the quantity of product withdrawn is termed the reflux ratio. In order to diminish the amount of labor, and to attain more uniform distillation, various equipment has been developed to control automatically the rate of distillation and to maintain a constant reflux ratio. Likewise, various automatic equipment is known for separating the distillate into cuts so that several products from the still can be segregated.

Depending upon the closeness of fractionation desired, the reflux ratio required may vary from 1:1 to as high as 20:1, or even higher. Even with highly efficient fractionating columns, high reflux ratios are required when it is desired to obtain a close fractionation of product such as is required for laboratory investigations or in the commercial separation of organic liquids of high purity. An especially high reflux ratio is needed during the period of transition of one product to another, whereas a substantially lower reflux ratio may be used during those periods when the composition of the product is constant.

With an automatic still of the usual type, unless an attendant is present to adjust the reflux ratio as required, the reflux controls must remain set at the high ratio needed during product changes and the entire distillation must be conducted at this ratio. Consequently, the time normally required to complete a distillation in an entirely automatic still is far greater than when the reflux ratio can be reduced during periods of constant product composition.

In accordance with the present invention the reflux ratio of an automatic still may be set at the low value desired for constant product composition, and when the slightest change in composition occurs, the reflux ratio will be automatically doubled, tripled, or increased to any desired extent. After the composition of the product becomes constant again, the normal reflux ratio is automatically reestablished. It is thus seen that, by use of the invention, a large amount of time may be saved in the distillation of a batch of material in an automatic still.

The invention will better be understood by reference to the drawings, Figure 1 of which illustrates in diagrammatic form mechanical and electro-mechanical apparatus embodying principles of the invention.

Figure 2 is a schematic diagram illustrating a preferred form of electronic apparatus exemplifying features of the invention.

Referring to Figure 1, there is represented by the numeral 1 a sectional view of the head of a laboratory type distillation column, which is equipped with "finger" type condensing coil 2 positioned to condense vapors which rise in head 1 and to direct the condensate into valve 3 and draw-off line 4. For controlling the reflux ratio, valve 3 is intermittently opened and closed by needle 5 which is operated by solenoid 6. When the circuit between terminals 7 and 8 is closed (as will be explained later) solenoid 6 is energized by current controlled by any suitable timing device, which is illustrated by cam 9, operated by clock-work 10 and actuating contact points 11. When the lobe of cam 9 depresses its follower, contact points 11 are closed permitting current to pass through solenoid 6 which, upon becoming thus energized, raises valve pin 5 opening valve 3 and causing liquid condensing on surface of coil 2 to be discharged through draw-off line 4. When the lobe of cam 9 passes beyond its follower, contacts 11 open breaking the circuit to solenoid 6 and permitting pin 5 to close valve 3. When valve 3 is closed, the condensate is unable to enter line 4 and consequently drains down column head 1 and returns to the fractionating column (not shown) as reflux. It is apparent, therefore, that the reflux ratio of the column may be set at any desired value depending upon the ratio of the length of periods during which contact points 11 are open and closed.

Various timing devices are available on the market and the form depicted by cam 9, contact 11 and clock-work 10 is for the purpose of simplicity of illustration and, per se, forms no part of the present invention. Likewise, still-head 1, condensing coil 2, and valve 3 are illustrative of a commonly used form of reflux control, but the particular design thereof shown in Figure 1 is merely for illustrative purposes to explain the operation of the invention.

In accordance with the invention, during periods when the product obtained from line 4 is changing in composition, the scheduled openings of valve 3 are interrupted thereby causing a greater proportion of condensate to be returned to the column as reflux, thus increasing the reflux ratio at a time when high rates of reflux are desirable.

To this end there is sealed (or otherwise introduced) into column-head 1 a thermocouple 12 located at any point where control may be desired. The cold junction 13 of the thermocouple is positioned in a constant temperature bath (not shown) or a suitable cold junction compensating device is included in the thermocouple circuit. Terminals 14 and 15 of the thermocouple are connected to a potential-balancing device, illustrated by slide-wire potentiometer 16, the slide 17 of which is operated by worm 18 and motor 19. In series with the thermocouple circuit there is placed a potential responsive means illustrated by galvanometer 20, the needle of which operates contacts 21 and 22 depending, respectively, upon whether the temperature of thermocouple 12 is above or below that corresponding to the position of slide 17. Motor 19 is equipped with two windings so arranged that passage of current through one winding causes the motor to rotate in one direction and passage of current through the other winding causes the motor to rotate in the opposite direction.

Accordingly, should the temperature of thermocouple 12 rise above that corresponding to the electrical potential between slide 17 and terminal 23 of potentiometer 16, current will flow through galvanometer 20 causing contact 21 to close and permit current from battery 24 to flow through leads 25 and 27 of motor 19 which will then rotate worm 18 raising slide 17 until a balance is reestablished. Likewise, should the temperature of thermocouple 12 fall below that corresponding to the potential between slide 17 and terminal 23, the current through galvanometer 20 will cause contact 22 to close, permitting current from battery 24 to flow through terminals 25 and 26 of motor 19. Motor 19 will then rotate worm 18 in the reverse direction lowering slide 17 until balance is established.

If desired, suitable relays of either the electromechanical or thermionic type may be introduced in the circuits of motor 19 for the purpose of reducing the currents handled by contacts 21 and 22, or to control the direction of rotation in the event an ordinary reversible motor is substituted for motor 19.

A feature important to the operation of the invention is relay 28 which is included in the circuit controlled by contact 21. It may be placed in series (as shown) or in parallel with motor terminals 25 and 27 as the characteristics of the current supplied by battery 24 may dictate. If desired, the current supplied to relay 28 may be amplified by suitable relays. Suffice it to say, for the present, that the circuit is such that relay 28 will operate upon a flow of current through galvanometer 20 corresponding to a rise in temperature of thermocouple 12.

It will be readily apparent to anyone familiar with the art of recording potentiometers that the balancing device depicted in Figure 1 by potentiometer 16, galvanometer 20, motor 19 and the described circuits is similar to well known types of recording and/or indicating potentiometers. In fact, for the purposes of the invention any type of balancing potentiometer may be substituted for galvanometer 20, potentiometer 16, and motor 19, providing that provision is made to supply current to relay 28 during any period when the temperature of thermocouple 12 is above that corresponding to the electrical potential of the balancing instrument.

The armature of relay 28 is so connected with a timing device, represented in Figure 1 by cam 29 operated by clockwork 30, that when relay 28 is energized, thus opening contact 31, the latter will remain open for a predetermined time. As illustrated in Figure 1, this is accomplished by pin 32 which normally engages in slot 33 of cam 29 preventing clockwork 30 from operating. Upon relay 28 becoming energized, pin 32 is withdrawn from slot 33 permitting cam 29 to be rotated by clockwork 30. During rotation of cam 29, pin 32 rides on the surface of cam 29 holding contact 31 open until cam 29 makes one complete revolution and slot 33 is again in position to be engaged by pin 32, which engagement stops the clockwork until relay 28 is again energized. As seen in Figure 1, contact 31 opens the circuit to solenoid 6 from timer 9 through terminals 7 and 8 thereby causing valve 3 to remain closed during the time required for one revolution of cam 29.

Preferably, clockwork 30 is so adjusted that the time for one revolution of cam 29 is greater than that for one revolution of cam 9, so that upon operation of relay 28 (which in turn is due to any rise of temperature of thermocouple 12) valve 3 will skip one scheduled opening, thereby doubling the reflux ratio. If desired, the timing of cam 29 can be adjusted to cause valve 3 to skip two or more scheduled openings upon actuation of relay 28.

In some instances, especially where low reflux ratios are employed, it may be desired to decrease the time of rotation of cam 29, or to eliminate cam 29 entirely. In such cases valve 3 will be closed, contrary to its regular schedule, for only short periods with correspondingly small increase in reflux ratio.

Operation of the apparatus may be readily understood if it is assumed that head 1 is attached to the distillation column of a laboratory still in which a mixture of two hydrocarbons (for example, a mixture of benzene and toluene) is being distilled. The still may advantageously be equipped with an automatic heater and control giving an approximately constant boil-up rate.

Also, suitable automatic equipment may be supplied to segregate the distillate product from line 4 into desired cuts. Likewise, if desired, suitable temperature recording apparatus may be added, controlled either by a separate thermocouple or by the operation of slide 17 of potentiometer 16. Vapors rising in head 1 are condensed on the surface of coil 2 and the condensate drains into valve 3. At the particular period depicted in Figure 1, valve 3 is open and the condensate is drawn off through line 4 to the receiving apparatus.

Timing cam 9 and clockwork 10 are set for the reflux ratio to be maintained during periods of constant product composition, i. e. during periods of constant temperature at thermocouple 12. For example, a reflux ratio of 9:1 may be chosen and cam 9 may be adjusted to close contact 11 for six seconds every minute. As cam 9 rotates from the position shown contact 11 opens breaking the circuit to solenoid 6 and permitting pin 5 to drop into and close valve 3. Condensate from coil 2 will then be diverted to flow back down the column as reflux.

As long as the composition of the vapors in head 1 remain constant the temperature of thermocouple 12 will likewise remain constant and the electrical potential developed by the thermocouple at points 14 and 15 will be balanced by the potential between slide 17 and terminal 23 and no current will flow through galvanometer 20. Clockwork 30, will consequently, remain at rest, being held by the engagement of pin 32 in slot 33 of cam 29.

Distillation will then proceed at the 9:1 reflux ratio during the recovery of the major part of the lighter constituent of the mixture being distilled, e. g. during the recovery of most of the benzene from a benzene-toluene mixture. As the distillation of the lighter component nears completion some vapors of the heavier component (e. g. toluene) will reach head 1 causing a slight rise in the temperature of thermocouple 12 and causing current to flow through galvanometer 20. The needle of galvanometer 20 will accordingly close contact 21 permitting current from battery 24 to flow through relay 28 and terminals 27 and 26 of motor 19, which latter will rotate worm 18 and move slide 17 to a new position on potentiometer 16 and thus re-establish a potential balance with thermocouple 12. When relay 28 is energized, contact 31 will be opened and will remain open for one complete rotation of cam 29 which, for the example chosen, may advantageously be set to rotate in say 65 seconds which period is long enough to cause contact 31 to remain open during one closure of contact 11. Due to the opening of contact 31 no current can flow to solenoid 6 since the circuit is broken between terminals 7 and 8 and valve 3 will remain closed while contact 31 is open. Accordingly, valve 3 will be caused to skip one scheduled opening and will be open for only 6 seconds in two minutes, resulting in a reflux ratio of 19:1. This procedure will be repeated as long as the temperature of thermocouple 12 continues to rise, that is until the lighter component has been completely distilled and the operation of the still becomes stabilized on the heavier component.

Although for the purposes of illustration a two component mixture was used in the above example, it is obvious that the operation would be the same with a multi-component mixture. Each product of constant boiling point would be distilled mainly at the reflux ratio determined by cam 9 with an approximately double reflux ratio during periods of product change, where high reflux ratios are desired.

It will be obvious from the above description that many variations of the apparatus shown in Figure 1 may be made within the spirit of the invention in its broadest scope. For example, clockwork 10 and/or clockwork 30 may be replaced by a motor of approximately constant speed, or other timing devices may be substituted for cams 9 and 29. Certain thermionic timing devices are known which are adaptable to operate solenoid 6 in a manner similar to that described for timing device 9. Likewise, the opening of contact 31 may be caused to stop timing device 9 when contact 11 is open, instead of directly breaking the circuit to solenoid 6 at terminals 7 and 8. As stated above, various forms of balancing potentiometers may be used instead of the particular form illustrated. By the use of suitable apparatus, the opening of contact 31 may act directly to close valve 3 or a separate valve suitably located in line 4.

Figure 2 of the drawings illustrates a preferred variation of the potential balancing and reflux ratio changing apparatus embodying thermionic circuits. In Figure 2 there is illustrated in schematic form a thermocouple balancing potentiometer of the general type described in U. S. Letters Patent No. 2,150,006, issued to Parker and Aceves, comprising: thermocouple 12, D. C. to A. C. converter 50, two stages of amplification 51 and 52, and two-phase reversible induction motor 53, which operates worm 18 and slide 17 of slide-wire potentiometer 16. Operation of the balancing system may briefly be described as follows:

In converter 50, metal reed 54 is caused to vibrate between the poles of magnet 55 in synchronization with alternating current supplied from source 56 which supplies current to coil 57. The vibrating reed 54 alternately closes contacts 58 and 59 connected to opposite sides of the split primary of transformer 60. The center tap of the primary of transformer 60 is connected to slide 17. One terminal of thermocouple 12 is connected to reed 54 and the other terminal of thermocouple 12 is connected to terminal 23 of potentiometer 16. Due to vibration of reed 54, any current in the thermocouple circuit caused by an out-of-balance position of slide 17 will cause a current to flow alternately in one side and the other of the primary of transformer 60 resulting in an alternating potential in the secondary of transformer 60 which will be in-phase or 180° out-of-phase with alternating current source 56 depending upon the direction of flow of current through thermocouple 12. After amplification the resulting potential of the output terminals 61 and 62 of stage 52 will, likewise, be in-phase or 180° out-of-phase with source 56 depending upon the direction of current flow through thermocouple 12, which is dependant upon whether thermocouple 12 is at a higher or lower temperature than corresponds to the position of slide 17. The amplified current from stage 52 is fed to one winding of two-phase motor 53, the other winding being supplied with alternating current from source 64 which is in synchronization with, but 90° out-of-phase with, source 56. Accordingly, motor 53 is caused to rotate in one direction or the other depending upon whether the temperature of thermocouple 12 is above or below that corresponding to the setting of slide 17. The resulting rotation of motor 53 causes slide 17 to move correspondingly along potentiometer 16 and re-establish balance in the thermocouple circuit.

As is obvious to one familiar with the electronic art, stages 51, and 52 may be either transformer coupled (as shown, for simplicity of illustration) or they may be resistance coupled. The plate circuits may be fed by battery (as shown) or by alternating current through suitable rectifying means. Likewise, other types of converters may be substituted for converter 50. In one well known potentiometer-recorder on the market, known as the "Brown Electronik Continuous-Balance Potentiometer Pyrometer," stage 52 comprises twin diodes whose plate circuits are supplied with alternating current through a split secondary of a transformer whose primary is supplied from source 56. In this instrument the phase of the current from 61 and 62 is shifted 90° by use of suitable condensers (not shown) and the current supplied to motor 53 from source 64 is of the same phase as source 56, all of which is well known in the potentiometer art. Suffice it to say that, for the purposes of the variation of the invention illustrated in Figure 2, one winding of motor 53 is supplied with alternating current which lags or leads the alternating current supplied to the other winding by substantially 90° depending upon the direction of the flow of current in thermocouple 12.

For the purposes of the invention there is provided transformer 65, which may advantageously have a 1:1 ratio, the primary of which is connected to the output leads 61 and 62 of amplifier stage 52, and the secondary is connected to the control grid of thyratron tetrode 66. A positive cathode bias, indicated by battery 67, is provided of sufficient potential to prevent a plate current in this tube. As an example, cathode bias 67 may advantageously be from 6 to 15 volts, preferably about 10 volts. The plate of tube 66 is supplied with alternating potential from the secondary of transformer 68, the primary of which is connected to source 56. In the plate circuit of tube 66 there are included contact 69 of two-pole relay 70 and the coil of relay 72.

Tube 74 is a power tube, which may advantageously be of the pentode or beam power amplifier types, the plate circuit controlling the operation of relay 70. The control grid circuit includes, in series, contact 73 of relay 72 and negative grid bias, represented by battery 81, of sufficient voltage to prevent tube 74 from conducting when contact 73 is closed. Across the control grid of tube 74 there are placed condenser 75 and variable resistance 76 of sufficient size to maintain a negative charge on the control grid of tube 74 for a desired period of time after contact 73 is opened.

Contact 71 of relay 70 is placed in series with the reflux timing circuit illustrated in Figure 1 and takes the place of contact 31 of relay 28 in Figure 1.

The operation of the circuits of tubes 66 and 74 is as follows:

When the potential developed by thermocouple 12 is balanced by potentiometer 16 no alternating current is developed in the output terminals 61 and 62 of stage 52 and no potential is developed by the secondary of transformer 65. During such times tube 66 is cut off due to positive cathode bias 67. Contact 73 of relay 72 will then be open due to no current flowing in the plate circuit of tube 66. With contact 73 open, the control grid of tube 74 is at zero potential relative to its cathode permitting tube 74 to conduct and current will pass through the coil of relay 70 closing contacts 69 and 71.

When the temperature of thermocouple 12 is below the corresponding position of slide 17, i. e. during periods when the temperature of thermocouple 12 may be falling, an alternating potential is produced at terminals 61 and 62 producing an alternating potential at the terminals of the secondary of transformer 65. However, the potential so produced on the grid of tube 65 will be 180° out of phase with the potential produced on the plate of tube 66 by the secondary of transformer 68. Consequently, tube 66 will still be unable to conduct since its plate will be negative when its grid is positive and when the plate is positive the grid will be negative.

However, during periods when the temperature of thermocouple 12 is rising, the potential produced by the secondary of transformer 65 will be in-phase with that produced by the secondary of transformer 68 and tube 66 will conduct permitting current to pass through relay 72, thereby closing contact 73. Upon closure of contact 73 a negative grid bias is established on tube 74 cutting off this tube and simultaneously charging condenser 75. When tube 74 is so cut off, current ceases to flow in relay 70 opening contacts 69 and 71. Opening of contact 69 cuts off the flow of current in tube 66 and opens contact 73 of relay 72. However, due to the charge accumulated on condenser 75, tube 74 will remain cut-off until this charge leaks off through variable resistance 76, after which tube 74 again conducts and relay 70 closes contacts 69 and 71 returning the system to normal operation.

Since contact 71 is in series with the timing circuit of solenoid 6 (Figure 1) the latter will remain inoperative and valve 3 will remain closed as long as contact 71 is open. By proper choice of the characteristic of condenser 75 and proper setting of resistance 76, the length of time that contact 71 is open can be regulated to cause valve 3 to miss one or more scheduled openings, thereby increasing the reflux ratio by double or more.

In commercial instruments of the type depicted by converter 50, amplifiers 51 and 52, and motor 53, the output of amplifier 52 may also, even at conditions of balance, contain a component of twice the frequency of source 56. Likewise, the phase of the output of stage 52 may purposely lag the phase of source 56 to permit proper operation of motor 53. In such cases the secondary of transformer 65 may be tuned to pass only the frequency of source 56 and the phase may be corrected by the addition of condenser 78 and/or resistance 77 across the secondary of transformer 65.

Also, in commercial instruments stray or transient electrical impulses may be generated of sufficient magnitude to trigger tube 66. This may be compensated by the addition of resistance 79 in the grid circuit of tube 74 to slow down the rate of charge of condenser 75 sufficient that tube 74 will not be cut off by a momentary closing of contact 73. The addition of condenser 80 across relay 70 also helps to compensate for stray impulses by permitting relay 70 to remain energized for a short period after tube 74 is cut off. The proper values for resistances 77 and 79, and for condensers 78 and 80 can readily be determined by one skilled in the electronic art with the aid of the above description.

Summarizing the above descriptions of Figures 1 and 2, the invention, in its broadest aspects may comprise either mechanical, electromechanical, or thermionic means for (a) balancing a thermocouple established in a distilling column, and (b) setting in motion a timing device arranged to increase the reflux ratio of the column for a predetermined period upon any rise of temperature in the column. Various modifications will suggest themselves to the technician within the scope and spirit of the invention as set forth in the appended claims.

We claim:

1. A temperature responsive apparatus for the control of reflux in a distillation column comprising, an electrically controlled valve for controlling the return or discharge of reflux, an electric circuit for controlling the valve, a timer in the circuit to supply current to the valve according to a selected schedule, a thermocouple in the column, means to balance the electrical potential of said thermocouple, means responsive to an unbalanced condition between the potentials of the thermocouple and said means for balancing to restore the balance of said means for balancing; a second timer, means responsive to an unbalanced potential in one direction to open said circuit and also to start said second timer, said second timer maintaining said circuit open for a fixed period irrespective of the schedule of the first timer.

2. A temperature responsive apparatus for the control of reflux in a distillation column comprising, an electrically controlled valve for controlling the return or discharge of reflux, an electric circuit for controlling the valve, a timer in the circuit to supply current to the valve according to a selected schedule, a thermocouple in the column, means to balance the electrical potential of said thermocouple, means responsive to an unbalanced condition between the potentials of the thermocouple and said means for balancing to restore the balance of said means for balancing; a second timer, means responsive to an unbalanced potential in one direction to establish the reflux-return condition of said circuit and also to start said second timer, said second timer maintaining said reflux-return condition of said circuit for a fixed period irrespective of the schedule of the first timer.

3. A temperature responsive apparatus for the control of reflux in a distillation column comprising, a pair of electric terminals adapted to be connected to an electrically controlled valve for controlling the return or discharge of reflux, an electric circuit including said terminals for controlling such valve, a timer in the circuit to supply current to said terminals according to a selected schedule, a second pair of terminals adapted to be connected to a thermocouple in the column, means to balance the electrical potential between said second pair of terminals, means responsive to an unbalanced condition between the potentials of said second pair of terminals and said means for balancing to restore the balance of said means for balancing; a second timer, means responsive to an unbalanced potential in one direction to open said circuit and also to start said second timer, said second timer maintaining said circuit open for a fixed period irrespective of the schedule of the first timer.

LIONEL S. GALSTAUN.
EDWARD R. KEEVER.

REFERENCES CITED

The following references are of record in the file of this patent:

UNITED STATES PATENTS

| Number | Name | Date |
| --- | --- | --- |
| 1,967,258 | Podbielniak | July 24, 1934 |
| 1,968,385 | Gille | July 31, 1934 |
| 2,022,809 | Kramer | Dec. 3, 1935 |
| 2,093,644 | Podbielniak | Sept. 21, 1937 |
| 2,203,689 | McDonald | June 11, 1940 |
| 2,275,648 | Podbielniak | Mar. 10, 1942 |
| 2,300,742 | Harrison et al. | Nov. 3, 1942 |
| 2,304,865 | Thumim | Dec. 15, 1942 |
| 2,342,206 | McMillan | Feb. 22, 1944 |
| 2,374,549 | McMillan | Apr. 24, 1945 |
| 2,453,486 | Ball | Nov. 9, 1948 |
| 2,467,008 | Brown | Apr. 12, 1949 |

OTHER REFERENCES

Steffens et al., Ind. and Eng. Chem. Anal. Ed., vol. 16 (1944), pages 525 to 527.

Ind. and Eng. Chem. Anal. Ed., vol. 17 (1945), pages 47 to 52.